US 008204934B2

(12) United States Patent
Natan

(10) Patent No.: US 8,204,934 B2
(45) Date of Patent: Jun. 19, 2012

(54) TECHNIQUES TO ENABLE FIREWALL BYPASS FOR OPEN MOBILE ALLIANCE DEVICE MANAGEMENT SERVER-INITIATED NOTIFICATIONS IN WIRELESS NETWORKS

(75) Inventor: Eetay Natan, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/027,951

(22) Filed: Feb. 15, 2011

(65) Prior Publication Data
US 2011/0138045 A1 Jun. 9, 2011

Related U.S. Application Data

(63) Continuation of application No. 11/967,325, filed on Dec. 31, 2007, now abandoned.

(51) Int. Cl.
*G06F 15/16* (2006.01)
(52) U.S. Cl. ......... 709/203; 709/228; 709/238; 709/250
(58) Field of Classification Search .......... 709/202–203, 709/227–228, 238–239, 250, 225
See application file for complete search history.

(56) References Cited

U.S. PATENT DOCUMENTS

| 5,778,174 | A | 7/1998 | Cain |
| 7,120,249 | B2 * | 10/2006 | Roberts ........................... 380/44 |
| 7,421,477 | B2 * | 9/2008 | Pettinato ........................ 709/227 |
| 7,577,140 | B2 * | 8/2009 | Curtis ........................... 709/227 |
| 7,603,408 | B1 * | 10/2009 | McGinnis et al. ............. 709/203 |
| 7,640,290 | B2 * | 12/2009 | Hayes, Jr. ...................... 709/203 |
| 2004/0181611 | A1 * | 9/2004 | Ratnakar ........................ 709/250 |

FOREIGN PATENT DOCUMENTS

| KR | 1020070089970 A | 9/2007 |
| WO | 2006070045 A1 | 7/2006 |

* cited by examiner

*Primary Examiner* — Bharat N Barot
(74) *Attorney, Agent, or Firm* — Ellis B. Ramirez

(57) ABSTRACT

An embodiment of the present invention provides a method, comprising enabling firewall bypass for open mobile alliance device management (OMA DM) server-initiated notifications in wireless networks by requiring that a certain OMA DM packet is captured by a modem associated with a OMA DM client and routed via a predetermined driver interface, wherein the OMA DM server initiates connection with the OMA DM client by sending a UDP packet to the OMA DM client inside a wireless device, and wherein the OMA DM packet is transferred over RF channel into a the modem, and through the wireless device OS's IP stack delivered to an application of the OMA DM client.

18 Claims, 2 Drawing Sheets

TECHNIQUES TO ENABLE FIREWALL BYPASS FOR OPEN MOBILE ALLIANCE DEVICE MANAGEMENT SERVER-INITIATED NOTIFICATIONS IN WIRELESS NETWORKS

BACKGROUND

WiMAX (a.k.a. Worldwide Interoperability for Microwave Access) is a wireless digital communications system, also known as IEEE 802.16, that is intended for wireless "metropolitan area networks". WiMAX can provide broadband wireless access (BWA) up to 30 miles (50 km) for fixed stations, and 3-10 miles (5-15 km) for mobile stations. In contrast, the WiFi/802.11 wireless local area network standard is limited in most cases to only 100-300 feet (30-100 m). With WiMAX, WiFi-like data rates are easily supported, but the issue of interference is lessened. WiMAX operates on both licensed and non-licensed frequencies, providing a regulated environment and viable economic model for wireless carriers. WiMAX can be used for wireless networking in much the same way as the more common WiFi protocol.

WiMAX is a second-generation protocol that allows for more efficient bandwidth use, interference avoidance, and is intended to allow higher data rates over longer distances. The IEEE 802.16 standard defines the technical features of the communications protocol. In the communications protocol, during WiMAX attachment process, OMA DM protocol is used to transport the provisioning information from a network server (the OMA DM server) into the client notebook. The client in a WiMAX network must be running OMA DM client, and the OMA DM client configures the WiMAX connection parameters.

An OMA DM communication is initiated in two stages:
a) DM Server sends UDP alert to the client
b) DM Client opens HTTPS session to the server It is stage (a) that is potentially blocked by a firewall and thus problematic. Thus, a strong need exists for techniques to enable firewall bypass for open mobile alliance device management server-initiated notifications in WiMAX networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
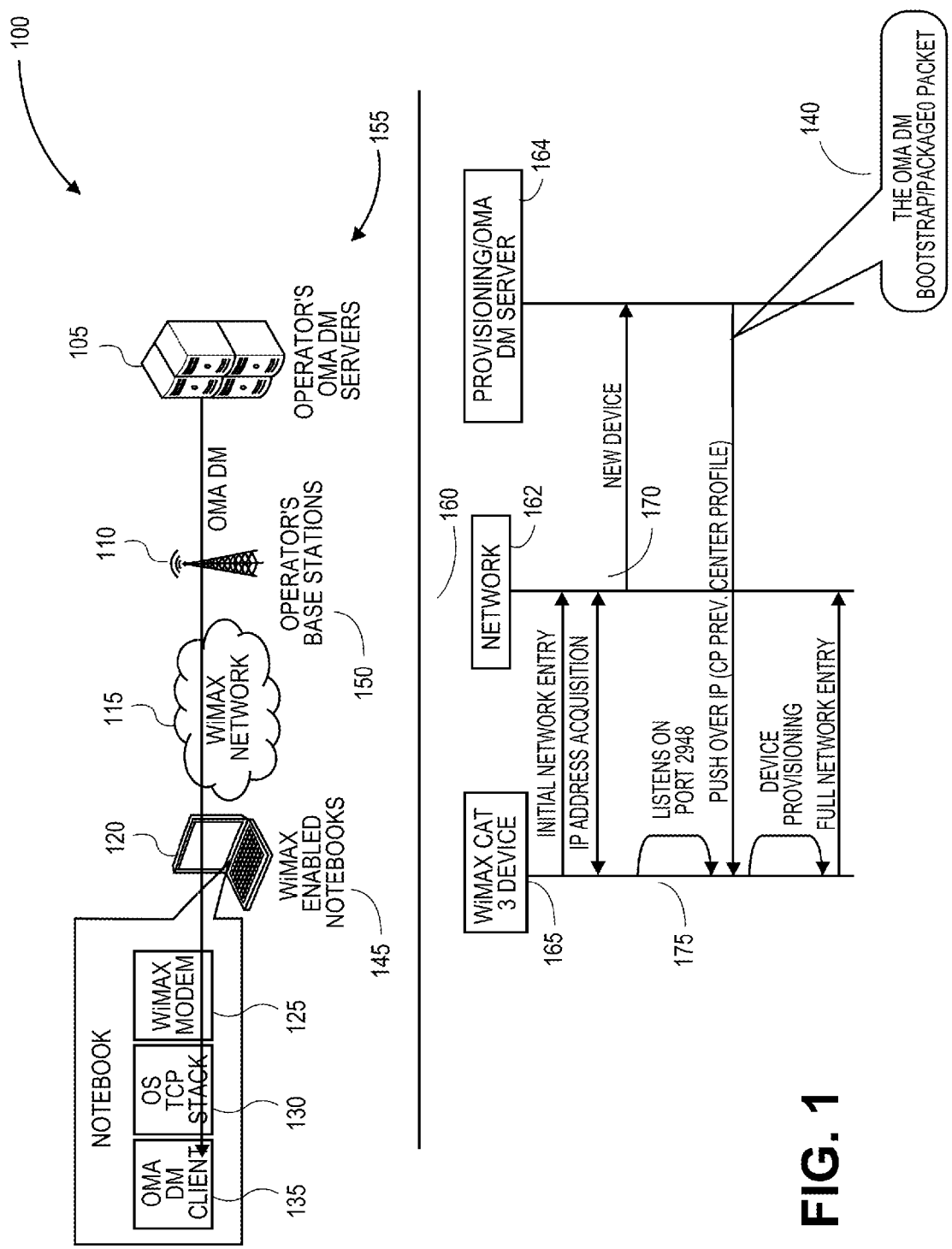
FIG. 1 illustrates system components and OMA DM communications according to an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

The present invention enhances the state of the WiMAX art enabling the WiMAX stack to provide provisioning and management support independent of Firewalls. Client machines may use different types of personal firewall applications. These firewalls have different APIs (some may not have API) and GUIs for configuration by application (API) and user (GUI). These products usually request user approval for automatic configuration. Firewalls may have different APIs depending on vendor, operating system (Linux, Windows) and API language (C, Java, etc) provided. The OMA DM client support for WiMAX is therefore either dependant on manual/user configuration, of the firewall, or must support all existing APIs (which may not be enough) to provide a foolproof service for to be used by a service provider.

An embodiment of the present invention addresses the aforementioned firewall configuration problem in WiMAX device management. Typical WiMAX access networks use OMA DM (a cellular management protocol—Open Mobile Alliance Device Management) for provisioning and initial setup of a WiMAX modem. OMA DM is, in the WiMAX case, using IP/HTTPS as the transport protocol and is therefore subject to blocking by any personal firewall installed on the machine.

An embodiment of the present invention is a change proposed to the WiMAX modem's firmware and/or WiMAX modem drivers, which cancels the need to configure the client's firewall. The WiMAX provisioning solution of the present invention is not dependant upon firewall configuration. Since there are many firewall products—it is hard to create a standard SW-based setup for firewalls. In addition to that, the security of the firewall itself might prevent software-based setup of the firewall.

Thus, an embodiment of the present invention provides that a certain OMA DM packet (referred to herein as Packet 0), which is an IP packet, is captured by the WiMAX modem, and routed via the IoCTL WiMAX driver interface, instead of the normal handling, which is to pass the packet into the OS's networking stack (Windows: NDIS).

Looking at FIG. 1, generally as 100, is an illustration of the system components and OMA DM communications according to an embodiment of the present invention. Operator's OMA DM 105 communicates OMA DM via operators base station 110 through WiMAX network 115 to wireless device 120 (such as, but not limited to Notebook computer with WiMAX capability). Notebook 120 may include WiMAX modem 125, OS TCP stack 130 and OMA DM client 135. Operation may progress as follows:

WiMAX Cat 3 Device 145 provides initial Network 150 entry at 160;

IP Address acquisition between WiMAX Device 145 and Network 150 at 162 with new device indication 164 to Provisional/OMA DM Server 155;

At 165 WiMAX Device 145 listens on Port 2948;

PUSH over IP from Provisional/OMA DM Server 155 to WiMAX Device 145 at 170 with Device provisioning at 175; and At 180 WiMAX device 145 provides full network entry 180 to Network 150. The OMA DM bootstrap/package 0 packet is shown at 140.

Figure 2:
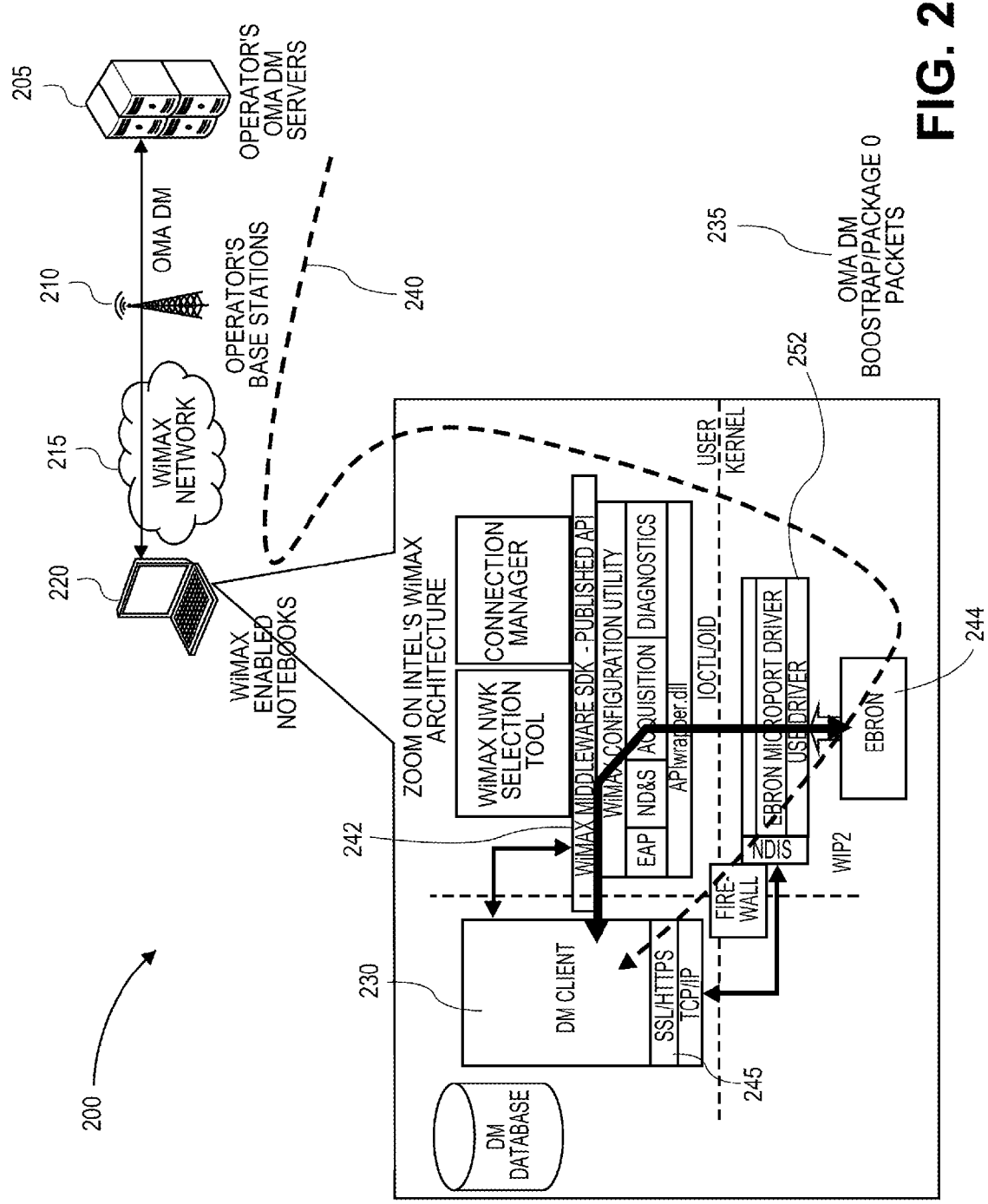
FIG. 2 shows a flow of the OMA DM initial packet according to an embodiment of the present invention.

Turning now to FIG. 2 is an illustration shown generally as 200 of the flow of OMA DM first provisioning packet for WiMAX shown as dotted line 240. The OMA DM server 205 initiates connection with the OMA DM client 230 by sending a UDP packet to the OMA DM client 230 inside the notebook 220. The two possible types of such packets in OMA DM may be referred to herein as "package 0" and "bootstrap" 235. The packet may be transferred over the WiMAX RF 215 via Operator's Base stations 210 into the WiMAX modem 244, and through the OS's IP stack 245 delivered to the OMA DM client application 230.

The new flow proposed by an embodiment of the present invention is depicted by the solid line 242. The WiMAX modem 244 monitors the incoming UDP packets and intercepts the OMA DM bootstrap/package 0 packets 235. In addition to submitting these packets to the normal IP stack 245, the WiMAX modem 244 also sends the information across the proprietary driver's IoCTL control interface 252 into the WiMAX control stack and from there to the OMA DM client application 230.

Interception of the packets may be by port number (2948 is the standard port for OMA DM), or by pattern matching the data of the UDP packet, or by comparing the UDP source IP address to a pre-set IP address of the OMA DM server—which the OMA DM client can pre-set in the modem.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

I claim:

1. A method, comprising:
   sending by an open mobile alliance device management (OMA DM) server a UDP packet to an OMA DM client inside a wireless device to initiate connection;
   capturing by a modem associated with the OMA DM client a certain OMA DM packet in the UDP packet; and
   enabling firewall bypass by requiring that the certain OMA DM packet be routed via a predetermined driver interface and through an IP stack delivered to an application of said OMA DM client;
   wherein said OMA DM packet is transferred over RF channel to said modem.

2. The method of claim 1, wherein said OMA DM packet is an IP packet.

3. The method of claim 1, wherein said predetermined driver interface is the IoCTL driver interface.

4. The method of claim 3, wherein said modem or its related drivers monitors incoming UDP packets and intercepts said OMA DM packets instead or in addition to submitting bootstrap/package 0 packets to a normal IP stack, said modem also sends the information across the proprietary driver's IOCTL control interface into a control stack and from there to said OMA DM client application.

5. The method of claim 4, wherein the interception of said packets is by port number or by pattern matching the data of the UDP packet or by comparing the UDP source IP address to a pre-set IP address of said OMA DM server which the OMA DM client pre-sets in the modem.

6. A system, comprising:
   an open mobile alliance device management (OMA DM) server; and
   a wireless client operable to communicate with said OMA DM server over a wireless network to enable firewall bypass by:
   receiving from the OMA DM server a UDP packet to initiate connection;
   capturing by a modem a certain OMA DM packet in the UDP packet;
   routing the OMA DM packet via a predetermined driver interface and through an IP stack delivered to an application of the wireless client.

7. The system of claim 6, wherein said OMA DM packet is an IP packet.

8. The system of claim 6, wherein said predetermined driver interface is a IoCTL driver interface.

9. The system of claim 6, wherein said OMA DM server initiates connection with said OMA DM client by sending a UDP packet to the OMA DM client inside a wireless device.

10. The system of claim 9, wherein said OMA DM packet is transferred over RF into a modem and through said wireless device OS's IP stack delivered to an application of said OMA DM client.

11. The system of claim 10, wherein said modem monitors incoming UDP packets and intercepts said OMA DM packets and instead or in addition to submitting bootstrap/package 0 packets to a normal IP stack, said modem also sends the information across the proprietary driver's IoCTL control interface into the control stack and from there to said OMA DM client application.

12. The system of claim 11, wherein the interception of said packets is by port number or by pattern matching the data of the UDP packet or by comparing the UDP source IP address to a pre-set IP address of said OMA DM server which the OMA DM client pre-sets in the modem.

13. A apparatus, comprising:
   a wireless device operable to communicate with a OMA DM server over a wireless network and capable of enabling firewall bypass by:
   capturing by a modem a certain OMA DM packet in an UDP packet from the OMA DM server;
   routing the OMA DM packet via a predetermined driver interface and through an IP stack delivered to an application of the wireless device.

14. The apparatus of claim 13, wherein said OMA DM packet is an IP packet.

15. The apparatus of claim 14, wherein said predetermined driver interface is the IoCTL driver interface.

16. The apparatus of claim 15, wherein said OMA DM server initiates connection with said wireless device by sending a UDP packet to the wireless device.

17. The apparatus of claim 16, wherein said OMA DM packet is transferred over RF into said modem, and through said wireless device OS's IP stack.

18. The apparatus of claim 17, wherein said modem monitors incoming UDP packets and intercepts said OMA DM packets and instead or in addition to submitting bootstrap/package 0 packets to a normal IP stack, said modem also sends the information across the proprietary driver's IOCTL control interface into the control stack and from there to said wireless client.

* * * * *